J. F. WOOD.
Cultivator.

No. 30,173.

Patented Sept. 25, 1860.

UNITED STATES PATENT OFFICE.

JOHN F. WOOD, OF HOUMA, LOUISIANA.

IMPROVEMENT IN CULTIVATORS.

Specification forming part of Letters Patent No. 30,173, dated September 25, 1860.

*To all whom it may concern:*

Be it known that I, JOHN F. WOOD, of Houma, in the parish of Terre Bonne and State of Louisiana, have invented a new and Improved Cultivator; and I do hereby declare that the following is a full, clear, and exact description of the same, reference being had to the accompanying drawings, forming a part of this specification, in which—

Figure 1:
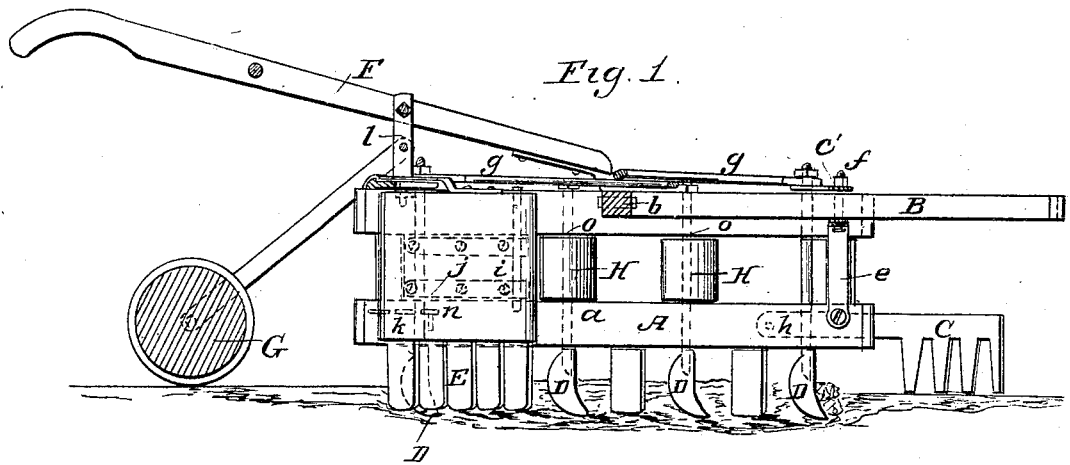
Figure 2:
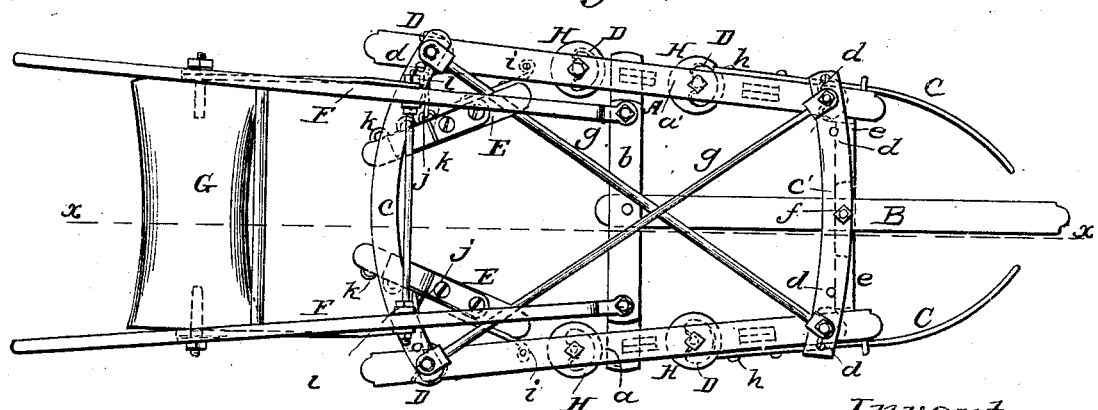

Figure 1 represents a longitudinal vertical section of this invention, the line $x\ x$, Fig. 2, indicating the plane of section. Fig. 2 is a plan or top view of the same.

Similar letters of reference indicate corresponding parts in both figures.

To enable those skilled in the art to make and use my invention, I will proceed to describe its construction and operation with reference to the drawings.

The frame A of my cultivator consists in two parts, $a\ a'$, which are united in the center by a cross-bar, $b$, and on the ends by means of braces $c\ c'$. The tenons at the ends of the cross-bar $b'$ pass loosely through the longitudinal timbers of the frame A, allowing the two parts of the latter to be brought in a parallel or in an angular position toward each other, as may be deemed desirable, or they may be drawn farther apart or closer together whenever it is necessary, and in order to allow the braces $c\ c'$ to accommodate themselves to the different positions to be given to the frame A, they are furnished with several holes, $d$, in their ends, so that by changing the bolts which retain said braces from one hole to the other the length of the same is changed according to the varying distance of the ends of said longitudinal timbers of the frame.

The draft-pole B is secured to the central cross-bar, $b$, and it is supported by the adjustable arched arms $e$, which are connected to the brace $c'$ in front of the machine by means of a screw-bolt, $f$. Braces $g$, passing crosswise over the top of the machine, still further strengthen the frame in the various positions into which it may be brought. The draft-pole B, as well as the cross-bar $b$ and the braces $c\ c$, are sufficiently elevated above the ground to pass over the growing plants.

Curved rakes C are secured to the front ends of the frame A, extending forward for the purpose of removing clods, old cane, stubbles, or other obstructions from before the corn, so that if this machine is used for planting nothing will be put on the seed but well-pulverized earth, and in using the machine for cultivating it brings nothing to the young and tender plant but fine earth. In mellow and clear ground these rakes can be laid aside, which is easily effected simply by removing the screws $h$.

The ground is turned up by the shovels D, which are attached to the under side of the frame A, and the quantity of earth to be put on the plants is regulated by two adjustable hinged wings, E. These wings swing on upright rods $i$, and their position is determined by hooks $j$ catching into loops $k$, or in any other convenient manner. Bars $k'$, secured to the top of said wings and catching over the brace $c$, serve to strengthen their position. By giving to these wings a greater or less inclination toward the direction in which the machine moves the amount of dirt thrown on the plants is regulated.

The handles F, by which the machine is directed by the operator, are bolted fast to the cross-bar $b$, and they are supported by two uprights, $l$, which are secured to the brace $c$ on the rear end of the frame A. By this arrangement the handles are always in their proper place, whether the machine is opened to its full extent or closed in front, as shown in Fig. 2.

When the machine is to be used for planting a pressing-roller, G, is attached to its rear end. This roller turns freely on an axle, $m$, that has its bearings in two arms, $n$, which are pivoted to the uprights $l$. For cultivating this roller is to be removed.

In the sides of the frame A, rollers H are arranged, which revolve easily on upright axles $o$. When the machine is to be drawn from place to place it is turned bodily over on one side, and the rollers H serve now as wheels, allowing the machine to be drawn from one field to the other without acting on the intermediate ground, and without injury to the shovels. This improvement is of peculiar advantage for the purpose of protecting the grass on the headlands in a plantation while passing with the machine from one place to another.

This machine works with great ease. It can be managed by one man, and one pair of mules or other draft-animals are able to move it under all circumstances. It can be easily understood and adjusted to suit the occasion, and all its parts are so constructed that they do not easily get out of repair.

Having thus fully described my invention, what I claim as new, and desire to secure by Letters Patent, is—

The arrangement of the hinged adjustable wings E, when used in combination with the adjustable frame A, shovels D, and rakes C, substantially in the manner and for the purpose set forth.

JOHN F. WOOD.

Witnesses:
T. F. BROOKS,
W. A. BAKER.